(12) United States Patent
Baba et al.

(10) Patent No.: US 7,005,167 B2
(45) Date of Patent: Feb. 28, 2006

(54) HEAT INSULATING CONTAINER AND MANUFACTURE METHOD THEREFOR

(75) Inventors: Naoho Baba, Tokyo (JP); Takafumi Fujii, Tokyo (JP); Isao Watanabe, Tokyo (JP)

(73) Assignee: Thermos K.K., Niigata-ken (JP)

(*) Notice: Subject to any disclaimer, the term of this patent is extended or adjusted under 35 U.S.C. 154(b) by 0 days.

(21) Appl. No.: 10/459,109

(22) Filed: Jun. 10, 2003

(65) Prior Publication Data
US 2004/0011796 A1    Jan. 22, 2004

(30) Foreign Application Priority Data
Jun. 13, 2002 (JP) .............................. 2002-173104

(51) Int. Cl.
*B32B 5/00* (2006.01)
(52) U.S. Cl. ..................... 428/34.4; 428/34.6; 428/342
(58) Field of Classification Search ........... 220/592.27; 428/34.4, 34.6, 342
See application file for complete search history.

(56) References Cited

U.S. PATENT DOCUMENTS

| | | | |
|---|---|---|---|
| 5,405,680 A * | 4/1995 | Chang et al. | 428/212 |
| 6,355,353 B1 * | 3/2002 | Hyodo et al. | 428/432 |
| 6,391,400 B1 * | 5/2002 | Russell et al. | 428/34 |
| 6,544,618 B1 * | 4/2003 | Smith | 428/69 |
| 6,569,548 B1 * | 5/2003 | Yamamoto et al. | 428/702 |
| 6,648,168 B1 * | 11/2003 | Fujii et al. | 220/592.21 |

FOREIGN PATENT DOCUMENTS

| | | |
|---|---|---|
| JP | 60-135021 | 7/1985 |
| JP | 60-153825 | 8/1985 |
| JP | 60-210220 | 10/1985 |
| JP | 2001-505088 | 4/2001 |
| WO | 98/18374 | * 5/1998 |

* cited by examiner

*Primary Examiner*—Joseph C. Merek
(74) *Attorney, Agent, or Firm*—J.C. Patents (57) ABSTRACT

A heat insulating container is described, including an outer glass container and an inner glass container housed therein with a gap formed in-between as a heat insulating layer. A radiant heat preventive film containing a metal oxide is disposed on at least one of the external surface of the inner container or the internal surface of the outer container, wherein the radiant heat preventive film has a reflectivity of 35% or higher with a wavelength of 15 $\mu$m. When the thickness of the radiant heat preventive film is 3000 Å, the Hall mobility "x" ($cm^2/V \cdot s$) and the carrier concentration "y" ($cm^{-3}$) of the same satisfy the following formulae: $y \geq -5 \times 10^{20} x + 2 \times 10^{21}$ and $y \geq -6 \times 10^{18} x + 3 \times 10^{20}$. When the thickness of the radiant heat preventive film is 5000 Å, x and y satisfy the following formulae: $y \geq -5 \times 10^{20} x + 3 \times 10^{21}$ and $y \geq -6 \times 10^{18} x + 7 \times 10^{20}$. Such radiant heat preventive films can have high reflectivity.

6 Claims, 10 Drawing Sheets

HEAT INSULATING CONTAINER AND MANUFACTURE METHOD THEREFOR

BACKGROUND OF THE INVENTION

1. Field of Invention

The invention relates to a heat insulating container having a double-wall structure and a manufacture method therefor. More specifically, the invention relates to a heat insulating container that includes an inner glass container and an outer glass container with a gap formed in-between.

2. Description of Related Art

A heat insulating container comprising an inner glass container and an outer glass container, such as a vacuum flask, has been in common use. The heat insulating container has a structure comprising an inner glass container housed in an outer glass container with a gap formed in-between. In such a heat insulating container, the gap is in a vacuum, or a low-thermal-conductivity gas (for example, argon, krypton or xenon) having a thermal conductivity lower than that of air is sealed within the gap, so that the gap can serve as a heat insulating layer. Furthermore, in this type of heat insulating container, a radiant heat preventive film is usually formed on the outer surface of the inner container or the inner surface of the outer container by utilizing a silver mirror reaction or the like.

To manufacture the above heat insulating container, for example, the following method may be adopted. The inner container and the outer container are integrally joined together at the ends of the container opening. Next, a silver-containing solution is injected into the gap such that the silver-containing solution gets adhered to predetermined surfaces of the inner and the outer containers. Next, the resulting structure is heated at a temperature of about 200° C. to dry the silver-containing solution and thereby form a silver film. Subsequently, the gap is made vacuum by exhausting the gap of air through a tip tube provided on the outer glass container. Otherwise, a low-thermal-conductivity gas is sealed within the gap. In both cases, the gap is transformed into a heat insulating layer.

Japanese Patent Application Laid Open Publication No. 2001-505088 discloses a heat insulating container, in which a radiant heat preventive film made of metal oxide ($SnO_2$, $In_2O_3$, ZnO, etc.) with a resistivity of $10^{-4}$ Ω·cm or less is formed on the surfaces of the inner container and the outer container. The heat insulating container disclosed in the above publication has an advantage that the contents of the container can be seen because the radiant heat preventive film is highly transparent.

However, a radiant heat preventive film formed from a metal oxide usually has a low performance in preventing radiant heat because of the restrictions of the manufacturing conditions. Therefore, it is difficult to produce a heat insulating container that is excellent in heat insulating capability.

SUMMARY OF THE INVENTION

Accordingly, in the light of the foregoing description, it is an object of the present invention to provide a heat insulating container that is excellent in thermal insulating capability and a manufacture method of the same.

To achieve these and other advantages and in accordance with the purpose of the invention, as embodied and broadly described herein, the invention provides a heat insulating container that has a radiant heat preventive film containing a metal oxide on at least one of the external surface of the inner container or the internal surface of the outer container. The reflectivity of the radiant heat preventive film to a radiation with a wavelength of 15 $\mu$m is 35% or higher.

The Hall mobility "x" ($cm^2$/V·s), the carrier concentration "y" ($cm^{-3}$) and the thickness "t" (Å) of the radiant heat preventive film satisfy the following formulae:

$$y \geq -5 \times 10^{20} x + 5 \times 10^{17} t + 0.5 \times 10^{21}$$

$$y \geq -6 \times 10^{18} x + 2 \times 10^{17} t - 3 \times 10^{20}$$

wherein 1 Å=$10^{-10}$ m (0.1 nm).

That is, for example, when the thickness "t" (Å) of the radiant heat preventive film is 3000 Å, the Hall mobility "x" ($cm^2$/V·s) and the carrier concentration "y" ($cm^{-3}$) satisfy the following formulae:

$$y \geq -5 \times 10^{20} x + 2 \times 10^{21}$$

$$y \geq -6 \times 10^{18} x + 3 \times 10^{20}$$

Similarly, when the thickness "t" (Å) of the radiant heat preventive film is 5000 Å, the Hall mobility "x" ($cm^2$/V·s) and the carrier concentration "y" ($cm^{-3}$) satisfy the following formulae:

$$y \geq -5 \times 10^{20} x + 3 \times 10^{21}$$

$$y \geq -6 \times 10^{18} x + 7 \times 10^{20}$$

The carrier concentration of the radiant heat preventive film is preferably within a range of $1.5 \times 10^{21}$/$cm^3$ to $1 \times 10^{22}$/$cm^3$.

To achieve these and other advantages and in accordance with the purpose of the invention, as embodied and broadly described herein, the invention provides a manufacture method of the heat insulating container, including forming a metal oxide film on at least one of the external surface of an inner glass container or the internal surface of an outer glass container. The metal oxide film is heated at a temperature of 400° C. or higher in a non-oxidative environment for 10 minutes or longer to form a radiant heat preventive film.

The metal oxide film may be formed with the following process. Firstly, the inner container and the outer container are integrally joining together. Then, materials for forming the metal oxide film is injected into the gap between the inner container and the outer container. Next, the resulting structure is heated at a temperature of about 400° C. or higher in an oxidative environment for 10 minutes or longer to form a metal oxide film. In an alternative embodiment, the metal oxide film is formed before the inner container and the outer container are integrally joining together.

The non-oxidative environment is preferably a vacuum environment, an environment filled with an inactive gas, or an environment filled with an inactive gas that is added with hydrogen.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
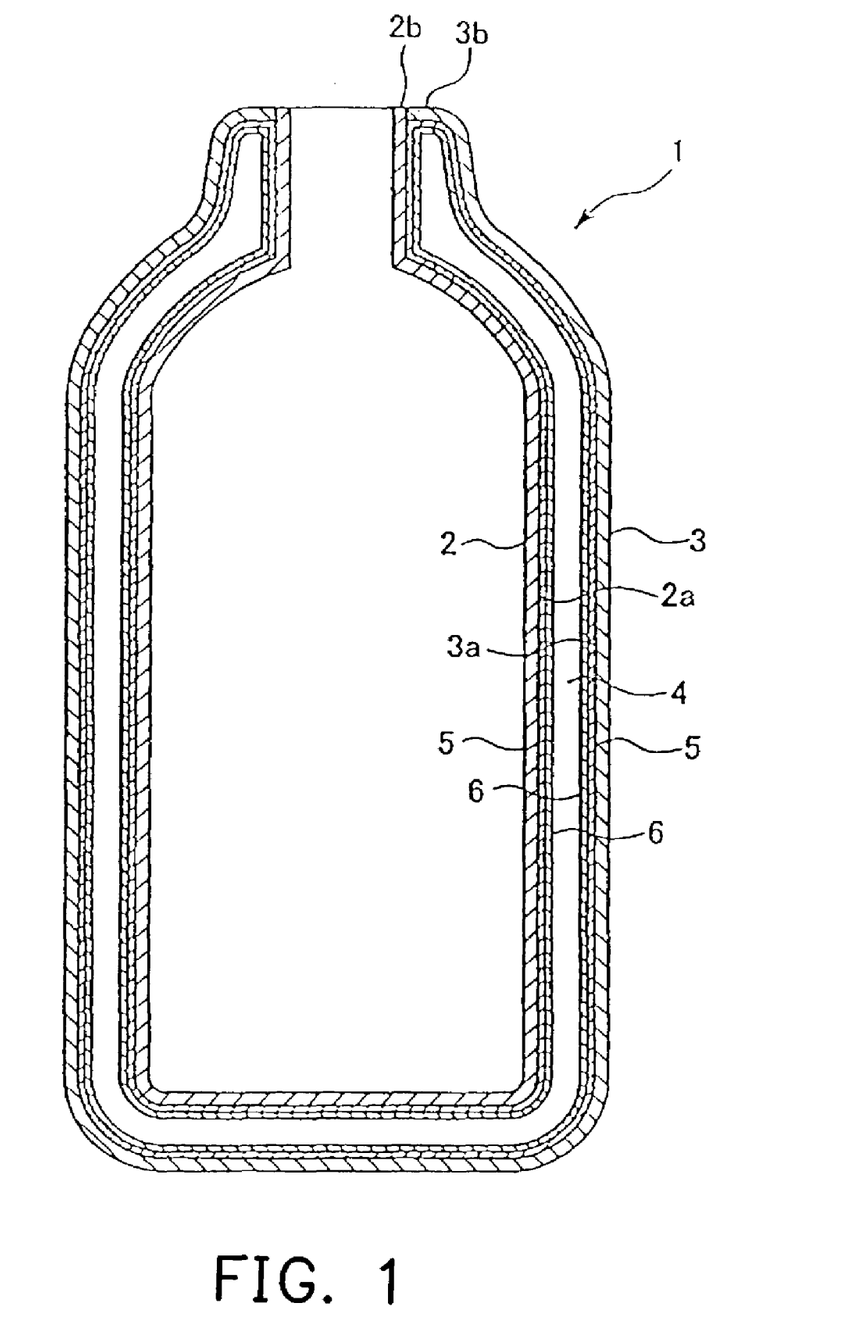
FIG. 1 illustrates a sectional view of a heat insulating container according to an embodiment of the present invention.

Refer to FIG. 1, which illustrates a sectional view of a heat insulating container according to a preferred embodiment of the present invention. In the heat insulating container 1 of the preferred embodiment, an inner glass container 2 is housed in an outer glass container 3 with a gap 4 formed in-between as a heat insulating layer.

The inner container 2 and the outer container 3 are joined together at respective opening ends 2b, 3b and integrated. In a preferred embodiment, both containers are joined together in an airtight manner by heating and softening the opening ends 2b and 3b, so as to make the gap 4 airtight.

The shape of the inner container 2 or the outer container 3 is not specifically restricted, and can be a cylinder shape, a ball shape or the like. However, in order to keep the width of the gap 4 between the inner container 2 and the outer container 3 approximately uniform, it is preferred that the inner container 2 and the outer container 3 have similar shapes.

The material of the inner container 2 and the outer container 3 can be soda-lime glass (soda glass), borosilicate glass, quartz glass or the like. Particularly, soda glass is inexpensive and therefore preferable. It is preferable to use a glass with a softening temperature of 500° C. or higher to constitute the inner and the outer containers 2 and 3. To raise the softening temperature of glass (soda glass and the like) above 500° C., it is effective to add impurity, such as $B_2O_3$, $Al_2O_3$ or the like, into the glass composition in a predetermined concentration. If the softening temperature is lower than 500° C., the inner and the outer containers 2 and 3 are easily softened and deformed during the formation of the intermediate film 5 or the radiant heat preventive film 6, possibly hampering the manufacturing of the intermediate film 5 and the radiant heat preventive film 6.

Both the outer surface 2a of the inner container 2 and the inner surface 3a of the outer container 3 are provided with the radiant heat preventive film 6, and with the intermediate film 5 between the respective surfaces 2a and 3a and the radiant heat preventive film 6. That is, the intermediate film 5 is firstly formed on the outer surface 2a and the inner surface 3a, and then the radiant heat preventive film 6 is formed on the intermediate film 5.

The intermediate film 5 is made of a material containing $SiO_2$, and is formed to repair the flaws on the external surface 2a of the inner container 2 and the internal surface 3a of the outer container 3 and thereby reinforce the inner container 2 and the outer container 3. However, the intermediate film 5 is not absolutely necessary for the fabrication of the heat insulating container 1, and the radiant heat preventive film 6 can be formed directly on the outer surface 2a of the inner glass container 2 and/or the inner surface 3a of the outer glass container 3 in such a case.

The flaws occurring on the inner container 2 or the outer container 3 usually reaches tens to hundreds of nanometers in depth. Therefore, the intermediate film 5 is preferably thick enough to fill the flaws. Moreover, the intermediate film 5 is preferably formed by stacking several thinner films each having a thickness such as tens of nanometers, since a single thick film formed in only one step usually has non-uniform thickness, and cracks are easily caused thereby. In consideration of the depth of flaws and the number of times for forming the intermediate film 5, it is preferable that the intermediate film 5 has a thickness of 50 nm or more, and more preferably, has a thickness within a range of 100 to 500 nm.

The radiant heat preventive film 6 is made of a material containing metal oxide. The radiant heat preventive film 6 is preferably composed of one or more compounds selected from a group consisting of ITO (Sn-doped $In_2O_3$), ATO (Sb-doped $SnO_2$), IZO (In-doped ZnO), AZO (Al-doped ZnO), GZO (Ga-doped ZnO), FTO (F-doped $SnO_2$) and FZO (F-doped ZnO). It is preferable that the thickness of the radiant heat preventive film 6 is about 150 nm to 500 nm.

Moreover, the radiant heat preventive film 6 has a reflectivity of 35% or higher with a wavelength of 15 μm. Therefore, the radiant heat preventive film 6 has a high performance in preventing radiant heat, and the heat insulating container 1 is excellent in thermal insulating capability. When the radiant heat preventive film 6 has a reflectivity of 35% or higher, the heat insulating capability of the heat insulating container 1 is higher than that of a conventional heat insulating container using a solid heat insulation material such as polyurethane.

Next, the factors that render the radiant heat preventive film 6 have a reflectivity of 35% or higher with a wavelength of 15 μm are described as follows.

Generally, reflection of an electromagnetic wave on a conductive semiconductor film, such as a semiconductive metal oxide film, is caused by motions of the free electrons in the film under the influence of the alternating electric field of the electromagnetic wave. As a result, the more, or the freer, the free electrons in the film are, the better the reflecting capability of the film to the electromagnetic wave is. Therefore, lower resistivity and increased carrier concentration of the radiant heat preventive film 6 contribute to improvement of the radiant heat insulation effect. Moreover, when the Hall mobility is sufficiently high, a high reflectivity can still be obtained even if the carrier concentration is relatively low.

For this reason, the thickness "t" (Å), the Hall mobility "x" ($cm^2/V \cdot s$) and the carrier concentration "y" ($cm^{-3}$) of the radiant heat preventive film 6 preferably satisfy the following formulae:

$$y \geq -5 \times 10^{20} x + 5 \times 10^{17} t + 0.5 \times 10^{21}$$

$$y \geq -6 \times 10^{18} x + 2 \times 10^{17} t - 3 \times 10^{20}$$

under the condition, the radiant heat preventive film 6 can have a reflectivity of 35% or higher with a wavelength of 15 $\mu$m, wherein 1 Å=$10^{-10}$ m (0.1 nm).

That is, for example, when the thickness "t" (Å) of the radiant heat preventive film 6 is 3000 Å, the Hall mobility "x" and the carrier concentration "y" satisfy the following formulae:

$$y \geq -5 \times 10^{20} x + 2 \times 10^{21}$$

$$y \geq -6 \times 10^{18} x + 3 \times 10^{20}$$

Analogously, when the thickness "t" (Å) of the radiant heat preventive film is 5000 Å, the Hall mobility "x" and the carrier concentration "y" satisfy the following formulae:

$$y \geq -5 \times 10^{20} x + 3 \times 10^{21}$$

$$y \geq -6 \times 10^{18} x + 7 \times 10^{20}$$

Thus, by specifying the thickness "t" (Å), the Hall mobility "x" ($cm^2$/V·s) and the carrier concentration "y" ($cm^{-3}$), the radiant heat preventive film 6 that has an outstanding radiant heat prevention effect can be manufactured easily. The Hall mobility "x" and the carrier concentration "y", etc., can be measured by using a well-known Hall-effect measuring instrument.

If the carrier concentration is higher than $1.5 \times 10^{21}$ $cm^{-3}$, in almost all cases, it is not correlated to the Hall mobility and will satisfy all conditions mentioned above. However, if the carrier concentration reaches the order of $10^{22}$ $cm^{-3}$, the film also reflects visible light to cause some problems. Therefore, in the radiant heat preventive film of the heat insulating container, the carrier concentration is preferably lower than $10^{22}$ $cm^{-3}$ and higher than $1.5 \times 10^{21}$ $cm^{-3}$.

On the other hand, the higher the Hall mobility is, the steeper the raise of the reflectivity in a reflection spectrum is, and thus the resulting reflectivity is higher, wherein the raise of the reflectivity means a change of the reflectivity from a low reflectivity region to a high reflectivity region within a narrow wavelength range. Therefore, the higher the Hall mobility is, the better the performance is. As the reflectivity is increased dramatically, the electromagnetic waves having a specific wavelength range corresponding to the radiant heat to be reflected can be reflected in high efficiency.

Figure 2:
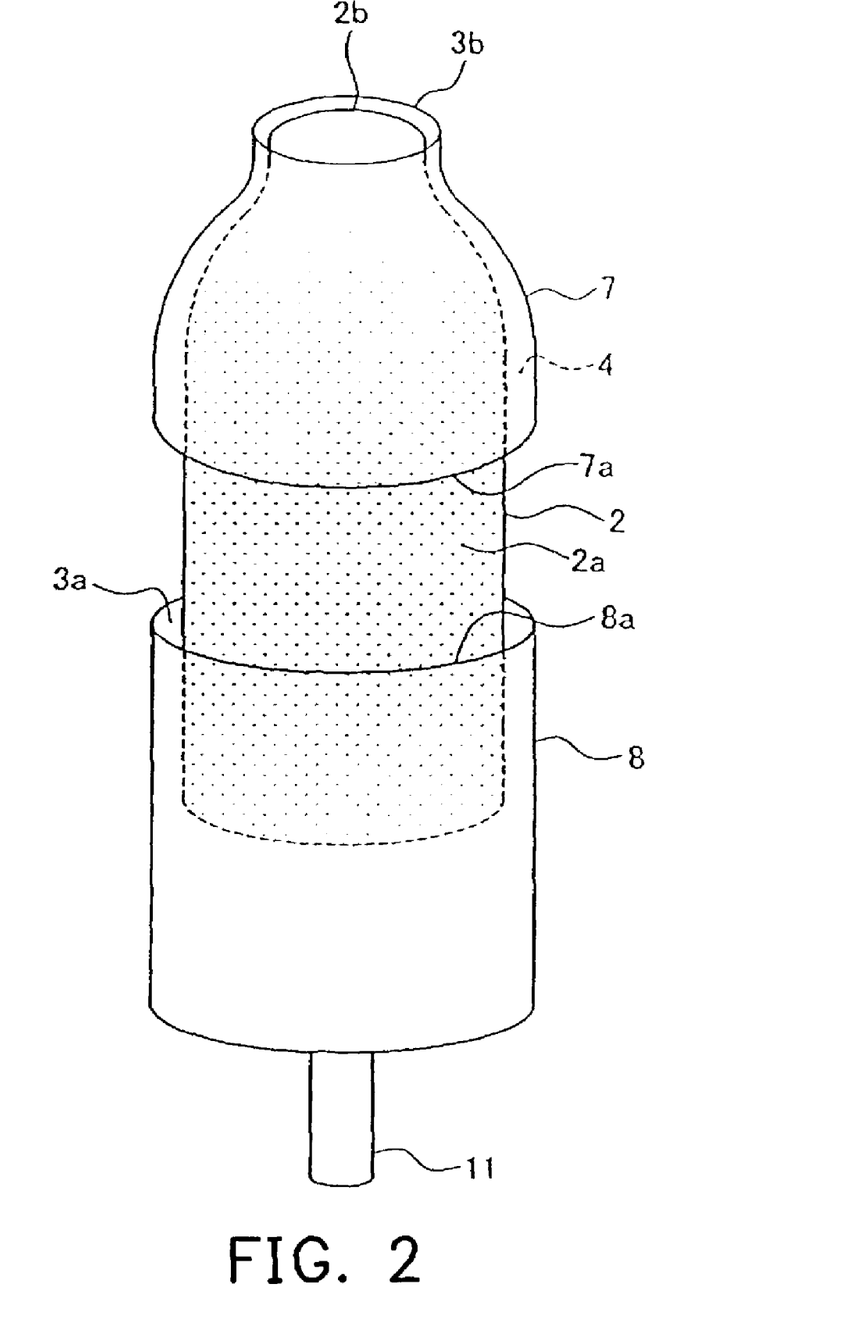
FIG. 2 illustrates a manufacture method of a heat insulating container according to an embodiment of this invention in a perspective view.

Next, with reference to FIG. 2, a manufacture method of the heat insulating container according to a preferred embodiment of this invention is described.

Firstly, an inner container 2 is molded with a desired shape, and an outer container 3 is molded with a shape basically similar to that of the inner container 2, and with a sufficient size so that the inner container 2 can be housed therein with a gap 4 between them. The outer container 3 is divided into an upper outer container 7 including an opening end 3b and a lower outer container 8 including a tip tube 11.

Next, an intermediate film 5 is formed on the external surface 2a of the inner container 2 and the internal surface 3a of the outer container 3.

The intermediate film 5 can be formed, for example, by conducting a sol-gel process.

Firstly, a starting material, such as $Si(OC_2H_5)_4$, is mixed with $C_2H_5OH$, water and hydrochloric acid as a catalyst in predetermined ratios, thereby forming an intermediate film material solution. This intermediate film material solution is made to adhere to overall surfaces of the external surface 2a of the inner container 2 and the internal surface 3a of the outer container 3 by using, for example, a coating process like a spin coating process or a dip coating process.

The thickness of the intermediate film 5 can be controlled to a desirable one by properly adjusting the concentration of the starting material in the intermediate film material solution and/or adjusting the number of times of applying the above material solution. It is preferable to set the above thickness according to the dimensions (depth, etc.) of the flaws on the inner container 2 or the outer container 3. For example, when the intermediate film material solution with the aforementioned composition is applied only once, an intermediate film 5 with a thickness of 0.1 to 0.5 $\mu$m is formed. Therefore, if the maximum depth of the flaws is around 1 $\mu$m, it is preferable that the intermediate film material solution is applied several times, e.g., two times, so that the flaws are completely filled with the intermediate film material.

Next, the inner container 2 and the outer container 3 are subjected to a heat treatment, by which the intermediate film material is thermally decomposed to form an intermediate film 5 containing $SiO_2$ on the external surface 2a of the inner container 2 and the internal surface 3a of the outer container 3. The temperature of the heat treatment is preferably within a range of about 300 to 600° C. If the temperature does not reach the above range, the decomposition of the intermediate film material is insufficient, raising a concern of a weak adherence of the intermediate film 5 to the inner and the outer containers 2 and 3. Meanwhile, if the temperature is over the upper limit, the cost of the heat treatment is increased. In addition, such a temperature exceeds the heat-resistant temperature of the inner and the outer containers 2 and 3, and is therefore not preferable.

It is desirable to confirm completion of the thermal decomposition and the drying step of the intermediate film 5 by performing a Thermogravity/Differential Thermal Analysis (TG-DTA) and analyzing the characteristic temperatures obtained from the TG-DTA curve. Moreover, a cross-sectional photograph of the container can be taken to help to confirm the completion of the steps.

Next, a metal oxide film is formed on the intermediate film 5. The metal oxide film is turned into a radiant heat preventive film 6 containing the metal oxide by performing a heat treatment (a calcination treatment), which is described later.

The metal oxide film can be formed by, for example, applying a material solution that contains a raw material such as a metal complex with a sol-gel coating process, a spraying process using hot spray mechanism, a spin coating process or a coating process using dip coating mechanism, etc., performing an annealing process at a temperature ranging from 400° C. to 500° C. in the atmosphere, and then cooling the product at 200° C.

Besides, the metal oxide film can be also formed by depositing a metal oxide material on the external surface 2a of the inner container 2 or the internal surface 3a of the outer container 3 by using a vapor-phase deposition method, such as a vacuum evaporation method, a sputtering method, and an ion plating method.

Next, the inner container 2 and the outer container 3 are integrally joined together.

At first, the upper part of the inner container 2 is housed in the upper outer container 7, and the opening end 3b of the upper outer container 7 and opening end 2b of the inner container 2 are melted and joined together in an airtight manner. Next, the lower outer container 8 is situated cover the lower part of the inner container 2, and the lower end 7a of the upper outer container 7 and the upper end 8a of the lower outer container 8 are melted and joined together in an airtight manner. In addition, some pads can be disposed between the inner container 2 and both the upper outer container 7 and the lower outer container 8, so that the inner container 2 and the outer container 3 can be integrally joined together with a gap 4 between them.

After the inner container 2 and the outer container 3 are integrally joined together, the metal oxide film is subjected to a heat treatment in a non-oxidative environment. The heat treatment decomposes the metal oxide and thereby eliminates excess oxygen atoms from the metal oxide film, by which the carrier concentration and the Hall mobility of the metal oxide film are raised, and its reflectivity with a wavelength of 15 μm therefore reaches 35% or higher. That is, the metal oxide film has been converted to a radiant heat preventive film 6 having a superior radiant-heat insulating capability.

The non-oxidative environment is, for example, a vacuum environment, an environment filled with an inactive gas, or an environment filled with an inactive gas that is mixed with a reductive gas such as hydrogen.

In order to perform a heat treatment in a vacuum, the method that heats a double-wall container in a vacuum using a vacuum-heating furnace can be used. Moreover, argon, nitrogen, krypton and xenon, etc., are mentioned as the inactive gas.

Moreover, if a mixed gas atmosphere that comprises an inactive gas added with a reductive gas like hydrogen is used, the reductive gas can react with the oxygen atoms emitted from the metal oxide film to prevent the oxygen atoms from reacting with the metal oxide film again. Moreover, the reductive gas may directly react with the metal oxide to reduce the latter efficiently.

The inactive gas can be, for example, argon, nitrogen, krypton, xenon or the like. Moreover, the reductive gas is preferably hydrogen. The addition amount of the reductive gas is preferred 0.01–1% by volume ratio to the whole mixed gas of the inactive gas and the reductive gas. For example, the addition amount can be 0.1%.

In order to successfully establish a non-oxidative environment around the metal oxide film before the heat treatment, the air in the gap 4 is exhausted, or an inactive gas is introduced into the gap through the tip tube 11. Moreover, when the inactive gas used for the heat treatment is a low-thermal-conductivity gas, such as argon, krypton or xenon, the low-thermal-conductivity gas can be retained in the gap 4, and then the gap 4 is sealed up to act as a heat insulating layer.

The temperature of the heat treatment is preferably 400° C. or higher, and more preferably from 400 to 600° C. Moreover, the heating time is preferably 10 minutes or longer. If the heating temperature or the heating time does not reach the above range, the reduction of the metal oxide film is insufficient.

If the heat temperature is over the above range, the cost of the heat treatment is increased. In addition, such a heating temperature exceeds the heat-resistant temperature of the inner and the outer containers 2 and 3, and is not preferable.

With the heat treatment, the metal oxide film is converted to a blackish or blueish transparent film that functions as a radiant heat preventive film 6. The resistivity of the metal oxide film is drastically decreased with the above heat treatment, so that the resulting radiant heat preventive film 6 has a resistivity far lower than that of the original metal oxide film. For example, when the resistivity of the original metal oxide film is in the order of $10^{-3}$ Ω·cm, the resistivity of the resulting radiant heat preventive film 6 can be decreased to a value smaller than that of the metal oxide film by one order of magnitude, which is in the order of $10^{-4}$ Ω·cm.

On the other hand, the carrier concentration of the radiant heat preventive film 6 is significantly higher than that of the pre-treatment metal oxide film. For example, when the carrier concentration of the metal oxide film is in the order of $10^{19}$ cm$^{-3}$, the carrier concentration of the radiant heat preventive film 6 can be increased to the order of $10^{20}$ to $10^{21}$ cm$^{-3}$.

Finally, after the radiant heat preventive film 6 is formed, the gap 4 is made vacuum and the exhausting tip tube 11 is sealed. It is also applicable to introduce a low-thermal-conductivity gas, such as argon, krypton or xenon, into the gap 4 and then seal the exhausting tip tube 11. Thus, with the processes described heretofore, the heat insulating container 1 of the present invention is obtained.

As mentioned above, the heat insulating container 1 according to the preferred embodiment of the invention has the radiant heat preventive film 6, which has a reflectivity of 35% or higher with a wavelength of 15 μm and therefore can efficiently reflect infrared rays and prevent radiant heat. Therefore, the heat insulating container 1 is excellent in heat insulting capability. Moreover, the radiant heat preventive film 6 is transparent in the field of visible light, and therefore has an advantage that the contents of the container can be seen from the outside.

Moreover, since the metal oxide film as a precursor of the radiant heat preventive film 6 is formed before the inner container 2 and the outer container 3 is integrally joined, it is not restricted to form by pouring a material solution into the gap 4. A variety of methods are thus possible for forming the film, which is an advantage of the invention. For example, the film can be formed by using a vapor-phase method like an evaporation method, but not restricted to form by using a liquid-phase method like a sol-gel method. For this reason, the optimal film formation method can be chosen, the cost of film formation can be reduced, and the productivity can be improved.

It is noted, of course, that there are also various methods for forming the intermediate film 5 on the heat insulating container 1, and the resulting effects are the same as those mentioned in the above cases of forming the metal oxide film.

Next, the second embodiment of fabricating the heat insulating container 1 of this invention is described. In the second embodiment, the intermediate film 5 and the metal oxide film as the precursor of the radiant heat preventive film 6 are formed after the inner container 2 and the outer container 3 are integrally joined together. At first, like the previous embodiment of the manufacture method of the heat insulating container 1, the inner container 2 and the outer container 3 are formed and integrally joined together to form a double-wall container.

Next, an intermediate film 5 is formed on the external surface 2a of the inner container 2 and the internal surface 3a of the outer container 3. The intermediate film 5 can be formed by using a sol-gel method. Then, a radiant heat preventive film 6 is formed on the intermediate film 5.

Hereafter, the sol-gel method for forming the radiant heat preventive film 6 is described.

At first, a material solution containing a metal complex like an acetylacetone-metal complex as a starting material of a metal oxide is prepared. This material solution is poured into the gap 4 through the tip tube 11, thereby adhering to the overall surface of the intermediate film 5. The excess material solution is drawn out through the tip tube 11. By heating the double wall container as required, the solvent in the material solution and the volatile by-products generated from the reaction are drawn out through the tip tube 11. Although the heating temperature depends on the properties of the material solution used, it is preferable to heat the container at about 190° C. in general if a material solution containing an acetylacetone-metal complex is used.

Next, the double wall container is heated under an oxygen containing atmosphere such as air. The heating temperature is preferably 400° C. or higher, and more preferably from 400° C. to 600° C. The heating time is preferably 10 minutes or higher.

If the heating temperature and the heating time do not reach the above ranges, the thermal decomposition of the material solution is insufficient, and a metal oxide film having a desired composition is difficult to obtain. Meanwhile, if the heat temperature is over the above range, the cost of the heat treatment is increased. In addition, such a heating temperature exceeds the heat-resistant temperature of the inner and the outer containers 2 and 3, and is therefore not preferable.

With the heat treatment, the starting material is thermally decomposed, and a metal oxide film is formed thereby.

Next, in order to increase the radiant heat prevention capability of the metal oxide film, the double wall container is further heated in a non-oxidative environment (e.g., in vacuum) to implement a heat treatment to the metal oxide film. The steps and the conditions of the heat treatment are the same as the above-mentioned.

With the heat treatment, the metal oxide film can function as a radiant heat preventive film 6. The resistivity of the metal oxide film is drastically decreased with the above heat treatment, so that the resulting radiant heat preventive film 6 has a resistivity far lower than that of the original metal oxide film. On the other hand, the carrier concentration of the radiant heat preventive film 6 is significant higher than that of the pre-treatment metal oxide film.

Finally, the gap 4 is made vacuum and the tip tube 11 is sealed. It is also applicable to introduce a low-thermal-conductivity gas, such as argon, krypton or xenon, into the gap 4 and then seal the exhausting tip tube 11. Thus, with the processes described heretofore, the heat insulating container 1 of the present invention is obtained.

Although this invention has been explained with the embodiments set forth above, various modifications can be made to the present invention without departing from the scope or the spirit of the invention.

For example, although the radiant heat preventive film 6 is formed on both the external surface 2a of the inner container 2 and the internal surface 3a of the outer container 3 in the embodiments, it is not limited to form with the implementation. For example, the radiant heat preventive film 6 may be form only on either the external surface 2a of the inner container 2 or the internal surface 3a of the outer container 3. In such cases, the radiant heat preventive film 6 can be formed by using the following method. At first, a metal oxide film is formed on either the external surface 2a of the inner container 2 or the internal surface 3a of the outer container 3 before the inner and the outer containers 2 and 3 is integrally joined together. After the inner and outer containers 2 and 3 are integrally joined together, the metal oxide film is subjected to a heat treatment to form the radiant heat preventive film 6. In such cases, the heat insulating container 1, which reduces the amount of the expensive metal oxide materials, and, furthermore, reduces the fabricating cost, is also excellent in heat insulating capability.

Moreover, in the manufacture method of the heat insulating container of the invention, it is also feasible to form the metal oxide film in two or more steps, wherein some steps are before and the other steps are after the inner and outer containers 2 and 3 are integrally joined together.

In addition, it is also possible to form the intermediate film 5 before the inner and the outer containers 2 and 3 are integrally joined together, and then form the metal oxide film and conduct a heat treatment to form the radiant heat preventive film 6 after the inner and the outer containers 2 and 3 are integrally joined together.

EXAMPLES OF THE INVENTION

Firstly, as shown below, five kinds of radiant heat preventive films (sample 1–5) are produced (Samples 1–5).

Sample 1

A material solution for a metal oxide film having the following composition is prepared.
 Acetylacetone-metal complex: 10 wt %
 Free acetylacetone: 10 wt %
 Isopropyl alcohol: 25 wt %
 Ethanol: 25 wt %
 Propylene glycol: 30 wt %
 4 wt % of Metal (In: Sn=95:5) is contained in this material solution.

After the above-mentioned material solution is applied to a glass substrate, a spin coating process is performed at 500 rpm for 3 seconds, and then at 1000 rpm for 15 seconds. Thereafter, the glass substrate is heated and dried at 190° C. in the atmosphere for 30 minutes. Next, thermal decomposition of the above-mentioned materials is carried out at 400° C. in the atmosphere, and the resulting film is heated at 400° C. in vacuum to form a uniform film of 1000 Å in thickness.

The above-mentioned operation is performed for three times to form a film of 3000 Å in thickness.

Furthermore, the obtained film is heated at 500° C. in the atmosphere for 60 minutes. The metal complex is under thermal decomposition in the heat treatment, and a metal oxide film is formed containing sintered and crystallized ITO. Thereafter, the resistivity, the carrier concentration, the Hall mobility, and the reflectivity in an infrared domain of the metal oxide film are measured.

Then, the film is heated under 600° C. in vacuum for 60 minutes. After the heat treatment in vacuum, the resistivity, the carrier concentration and the Hall mobility of the metal oxide film are measured again using a Hall-measuring instrument (BIO RAD Co. HL-5500), and the reflectivity in an infrared domain of the metal oxide film is measured using a FT-IR spectrometer.

Sample 2

Except the metal ratio is changed to 90:10, the radiant heat preventive film is formed with the same procedure for preparing Sample 1. In this case, before and after the heat treatment in vacuum, the resistivity, the carrier concentration, the Hall mobility and the reflectivity in an infrared domain of the metal oxide film are measured.

Sample 3

Except the metal ratio is changed to 85:15, the radiant heat preventive film is formed with the same procedure for preparing Sample 1. In this case, before and after the heat treatment in vacuum, the resistivity, the carrier concentration, the Hall mobility and the reflectivity in an infrared domain of the metal oxide film are measured.

Sample 4

Except the metal ratio is changed to 85:15 and spin coating are performed for five times to form a film of 5000 Å in thickness, the radiant heat preventive film is formed with the same procedure for preparing Sample 1. In this case, before and after the heat treatment in vacuum, the resistivity, the carrier concentration, the Hall mobility and the reflectivity in an infrared domain of the metal oxide film are measured.

Sample 5

A material having the same metal ratio of Sample 1 is used to form a metal oxide film containing ITO with a thickness of 3200 Å, using an electronic beam evaporation method in replacement of the above-mentioned spin coating method. Next, the obtained film is heated at 500° C. in the atmosphere for 60 minutes to form a film containing sintered and crystallized ITO. Thereafter, the resistivity, the carrier concentration, the Hall mobility and the reflectivity in an infrared domain of the metal oxide film are measured.

Then, the film is heated at 600° C. in a vacuum state for 60 minutes. After the heat treatment in vacuum, the same method for measuring Sample 1 is used to measure the resistivity, the carrier concentration, the Hall mobility and the reflectivity in an infrared domain of the metal oxide film.

The Measurement Results of the Radiant Heat Preventive Film

The measurement results of the resistivities, the carrier concentrations, the Hall mobilities, and the reflectivities in an infrared domain of the metal oxide films of the five samples mentioned above are respectively shown in FIGS. 3–10. Meanwhile, the results for resistivity, carrier concentration and Hall mobility are listed in Table 1.

Figure 3:
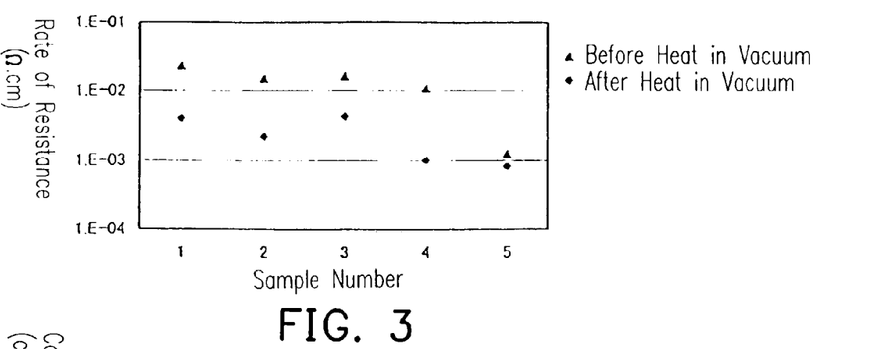
FIG. 3 is a graph showing respective resistivities of the metal oxide films of Samples 1–5.
Figure 4:
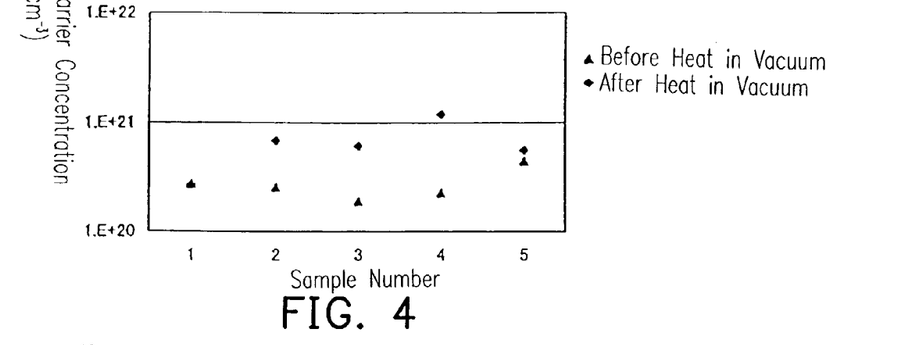
FIG. 4 is a graph showing respective carrier concentrations of the metal oxide films of Samples 1–5.
Figure 5:
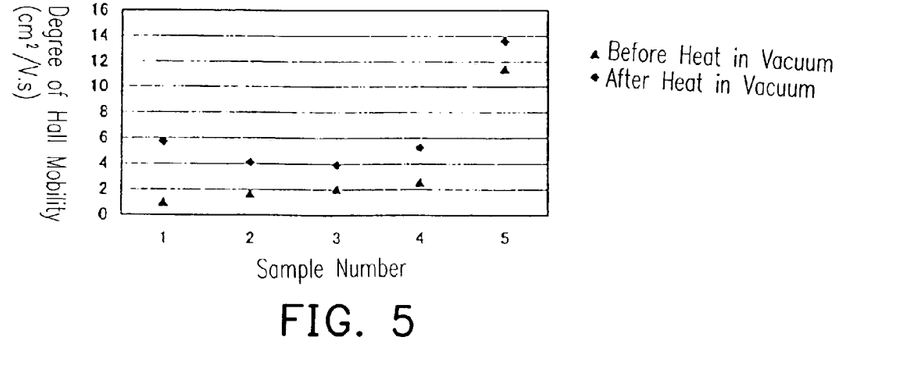
FIG. 5 is a graph showing respective Hall mobilities of the metal oxide films of Samples 1–5.
Figure 6:
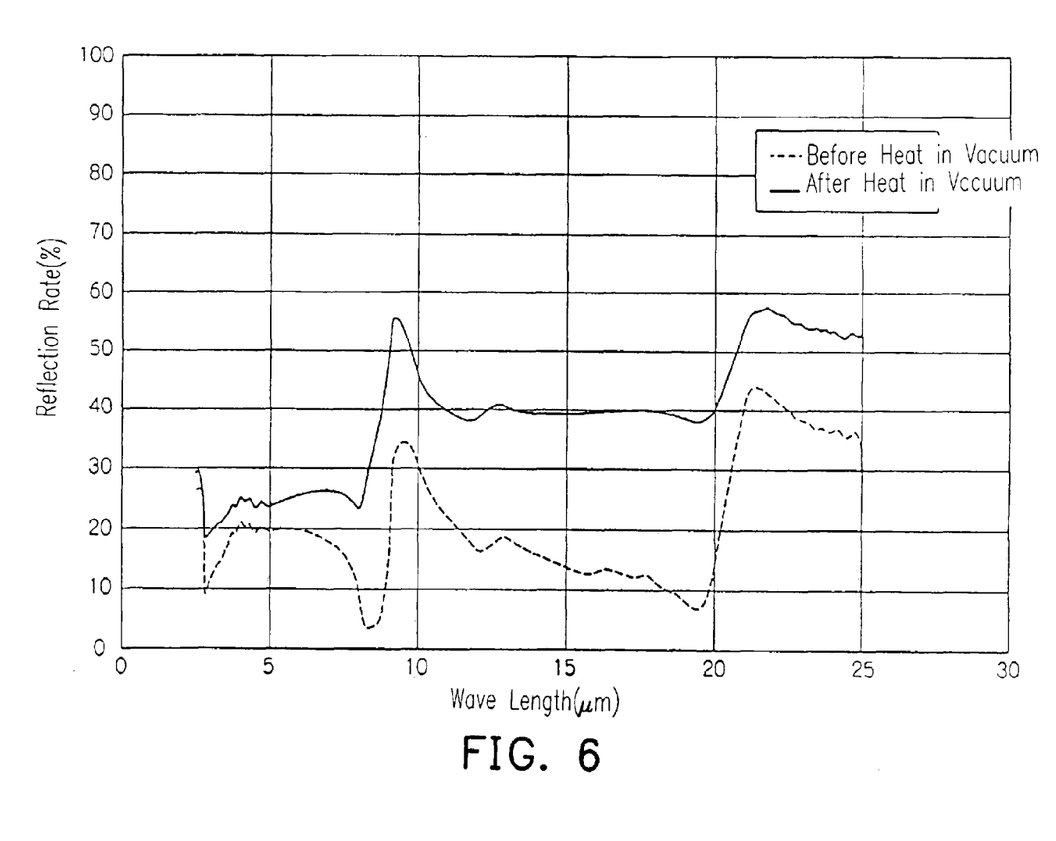
FIG. 6 is a graph showing the reflection spectrum of the metal oxide film of Sample 1.
Figure 7:
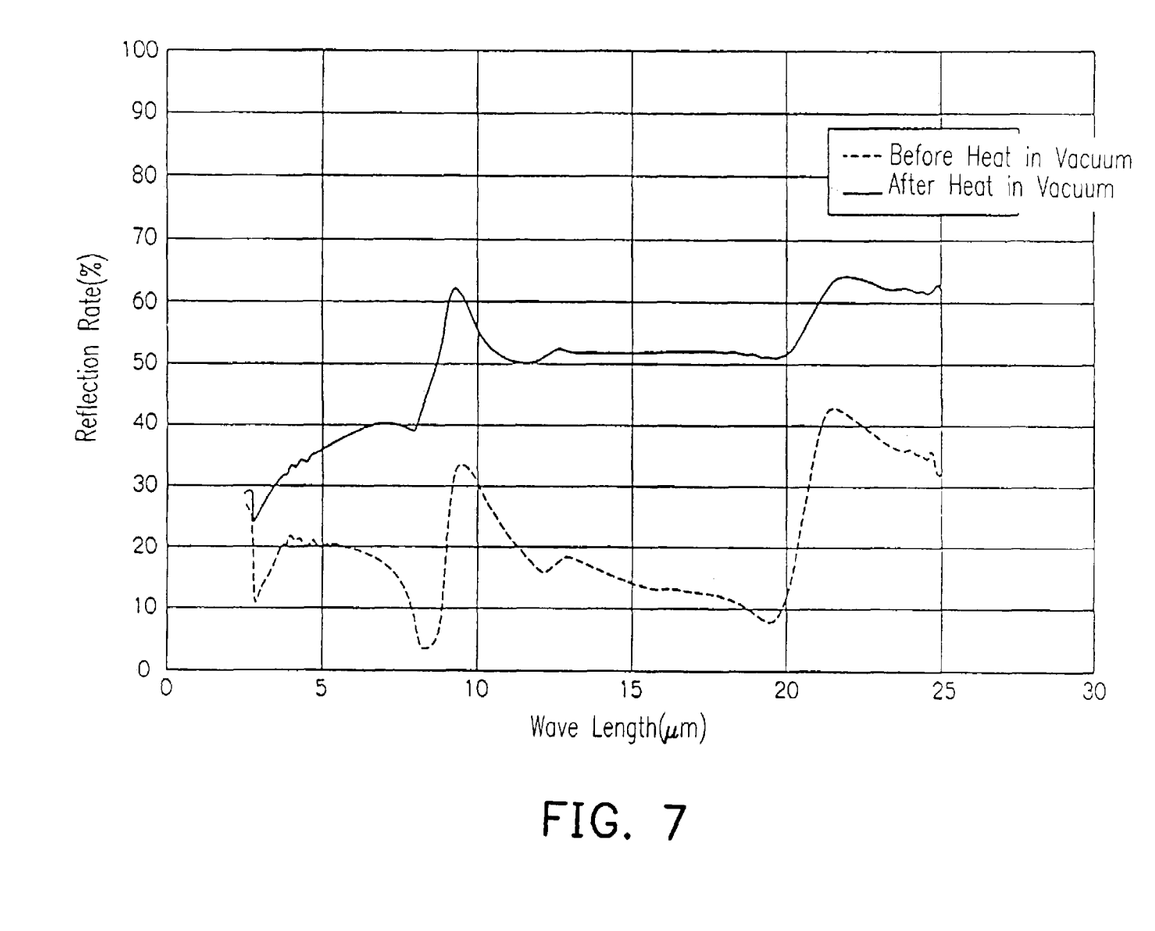
FIG. 7 is a graph showing the reflection spectrum of the metal oxide film of Sample 2.
Figure 8:
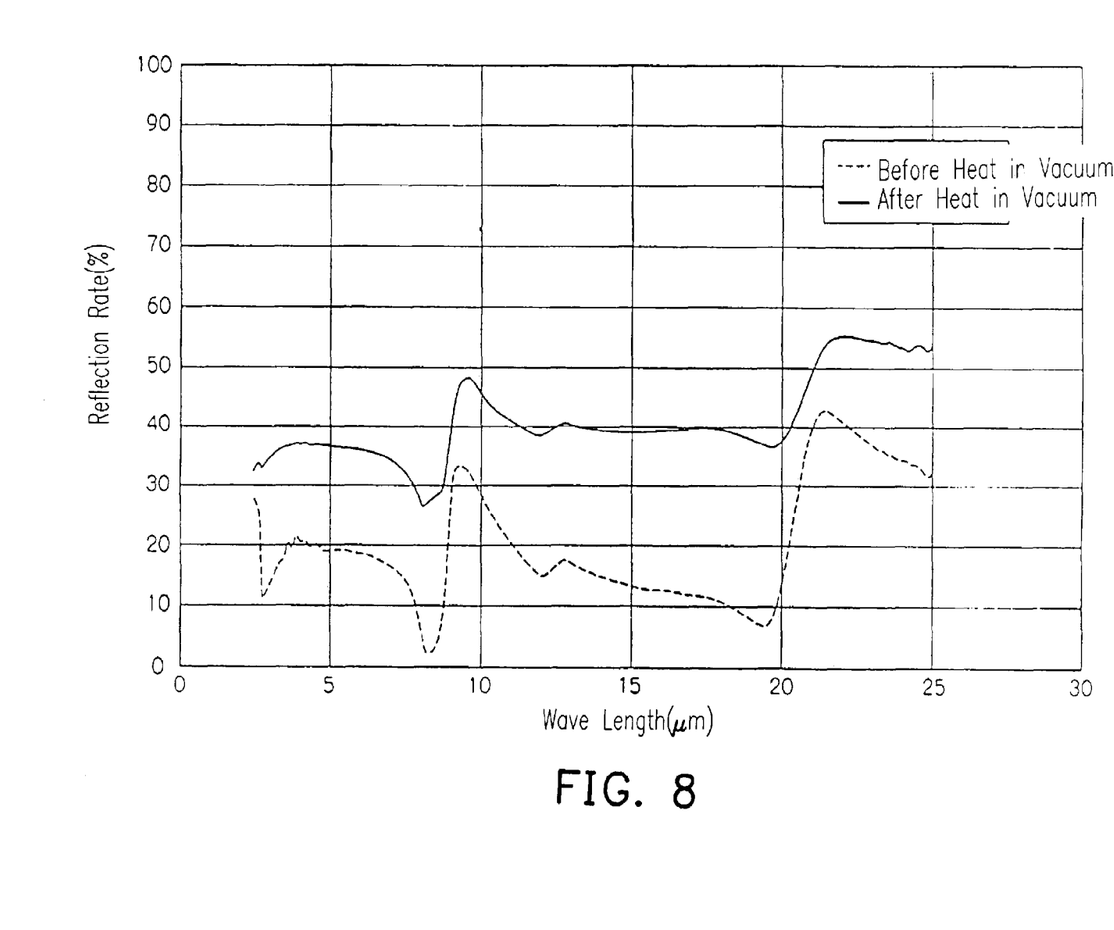
FIG. 8 is a graph showing the reflection spectrum of the metal oxide film of Sample 3.
Figure 9:
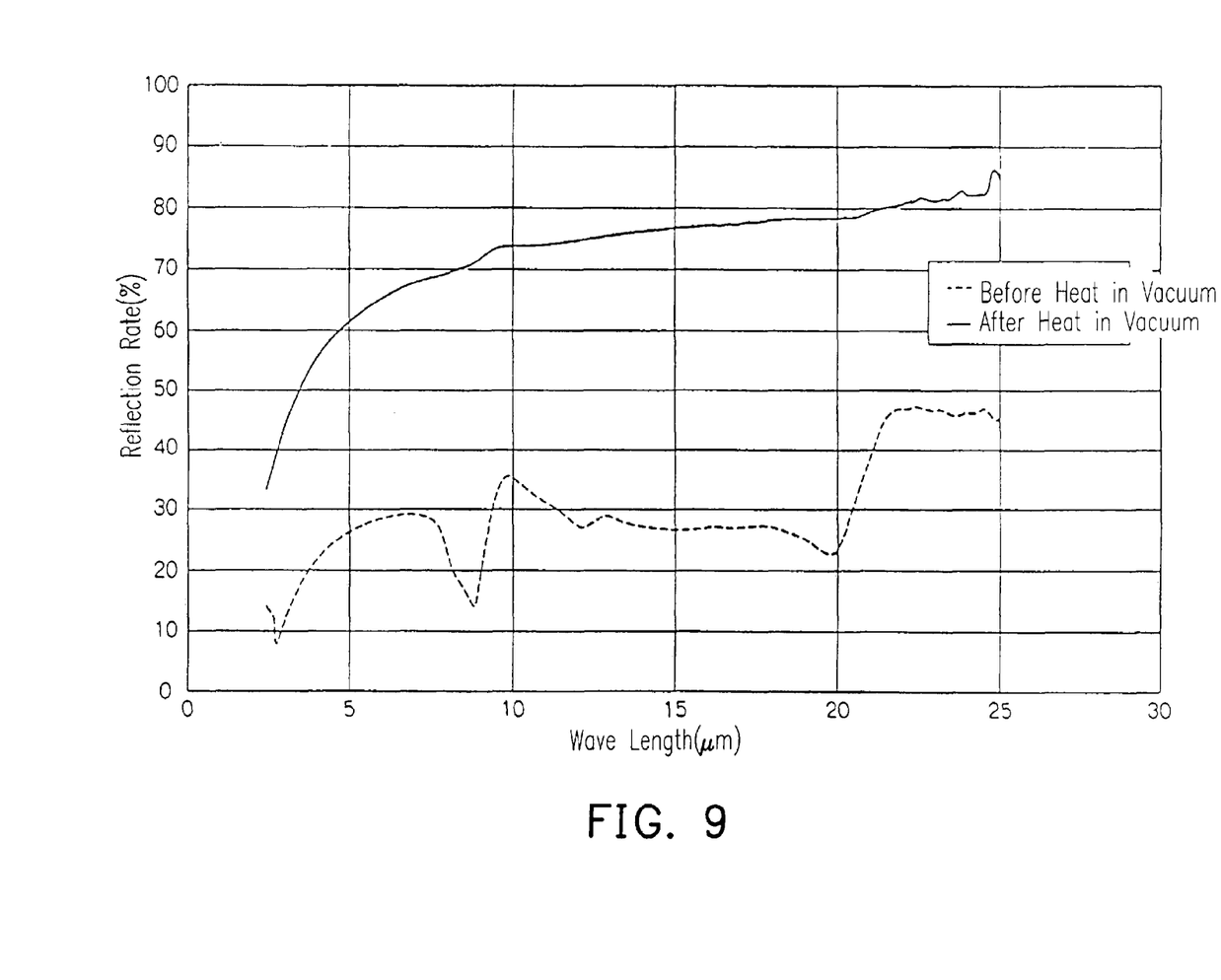
FIG. 9 is a graph showing the reflection spectrum of the metal oxide film of Sample 4.
Figure 10:
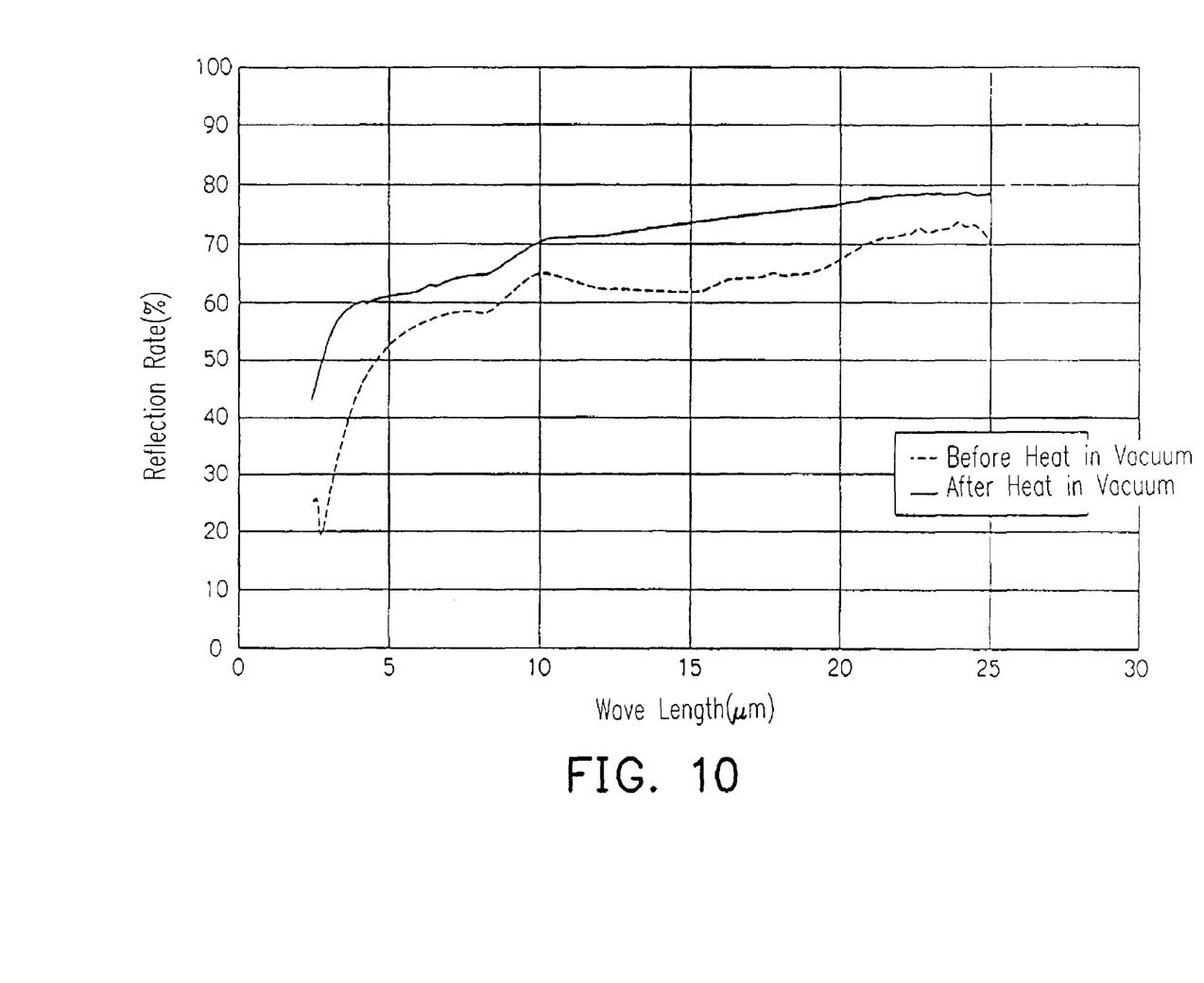
FIG. 10 is a graph showing the reflection spectrum of the metal oxide film of Sample 5.

It is shown in Table 1 and FIG. 3 that the resistivity is reduced by about 1 order with the heating treatment, i.e., from the order of $10^{-2}$ Ω·cm to the order of $10^{-3}$ Ω·cm. Meanwhile, the carrier concentration is increased with the heat treatment, as shown in Table 1 and FIG. 4. As shown in Table 1 and FIG. 5, the Hall mobility is also increased with the heat treatment.

Moreover, as shown in FIGS. 6–10, for all samples, it is clear that the reflectivity of the film is increased with vacuum calcination, which means that the manufacture method with vacuum calcination is more suitable for the radiant heat preventive film of a heat insulating container.

In addition, in the reflection spectra of these samples, although some peaks are present around wavelengths of 9 μm and 22 μm, they are actually caused by the reflection of the glass substrate, rather than the radiant heat preventive film (ITO film). The cause of the peaks near the two wavelengths can be confirmed by practically measuring the reflectivity of the glass substrate only.

Next, the temperature for the vacuum calcination is lowered, and the same experiment is conducted using the same samples. When the temperature for the vacuum calcination is lowered below 400° C., the effect in raising the reflectivity is small. If the calcination temperature is reduced down below 300° C., almost no increase is seen in the reflectivity.

Next, when the vacuum environment is replaced with an environment using a mixed gas atmosphere formed by adding 0.1% of hydrogen into nitrogen, the reflectivity of the metal oxide film is also increased with the heat treatment, as in the cases of adopting a vacuum environment. In addition, when the vacuum environment is replaced with an environment using 100% of nitrogen, the reflectivity of the metal oxide film is also increased with the heat treatment, as in the cases of adopting a vacuum environment.

Figure 11:
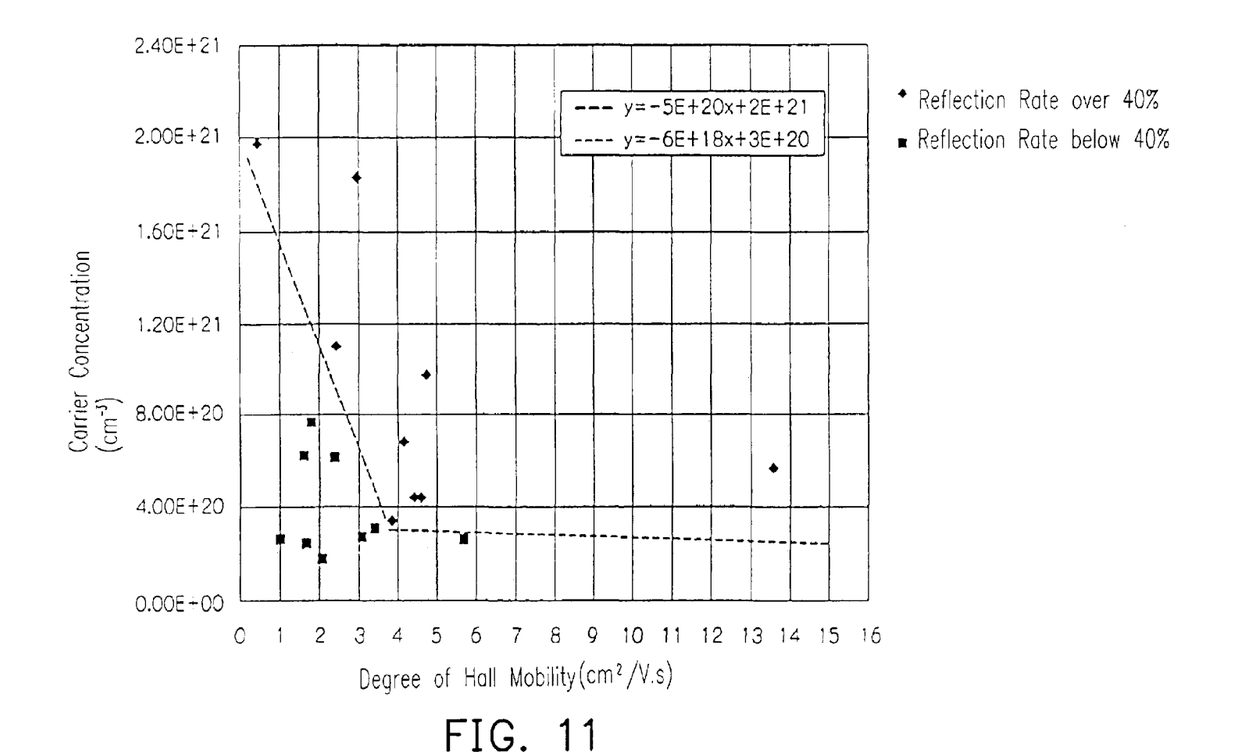
FIG. 11 is a graph showing an example of the relationship between the Hall mobility and the carrier concentration of a metal oxide film having a thickness of 3000 Å.

FIG. 11 plots the carrier concentration with respect to the Hall mobility for the metal oxide (ITO) films of several samples, wherein the ITO films has a thickness of about 3000 Å. The data points are shown in different marks depending on whether the corresponding reflectivity of the film is 35% or higher with a wavelength of 15 μm or not.

From the figure, it is clearly shown that if the Hall mobility is more than 3.9 cm²/V·s and the carrier concentration is more than $5 \times 10^{20}/cm^3$, the ITO film can have a reflectivity of 35% or higher with a wavelength of 15 μm, so as to function as a radiant heat preventive film. Moreover, even if the carrier concentration is lower than $5 \times 10^{20}/cm^3$, the reflectivity can still be 35% or higher if the Hall mobility is sufficiently high. Analogously, even if the Hall mobility is smaller than 4 cm²/V·s, the reflectivity can still be 35% or higher if the carrier concentration is sufficiently high.

According to the above results, when the thickness of the radiant heat preventive film is 3000 Å, the reflectivity can be 35% or higher if the following formulae are satisfied. The formulae are express as follows:

$$y \geq -5 \times 10^{20} x + 2 \times 10^{21} \quad (1)$$

$$y \geq -6 \times 10^{18} x + 3 \times 10^{20} \quad (2)$$

wherein "x" is the Hall mobility (cm²/V·s), and "y" is the carrier concentration (cm⁻³).

Figure 12:
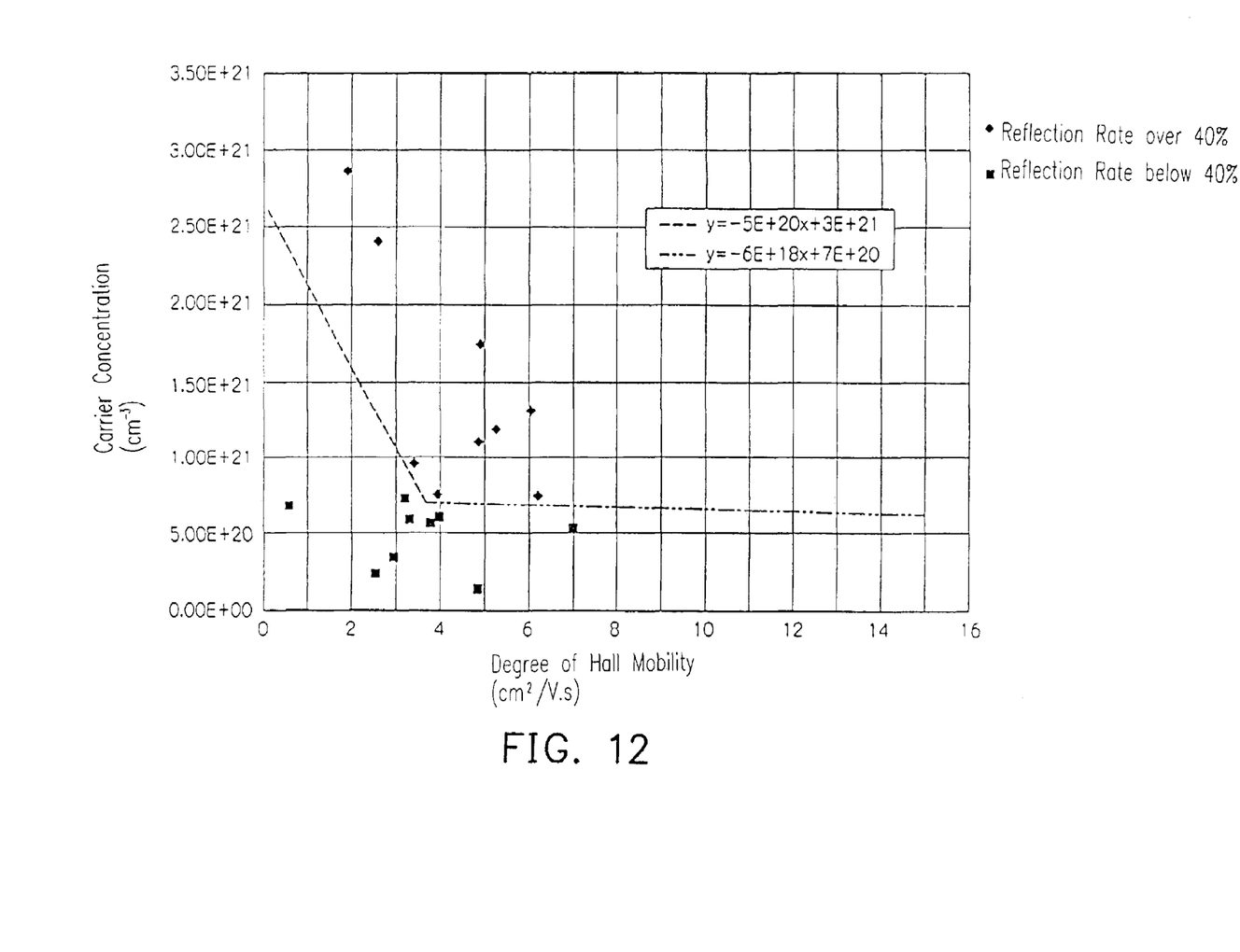
FIG. 12 is a graph showing an example of the relationship between the Hall mobility and the carrier concentration of a metal oxide film having a thickness of 5000 Å

Next, several samples having a radiant heat preventive film of 5000 Å in thickness are manufactured, and the relationship between the Hall mobility and the carrier concentration is shown in FIG. 12 in a similarly manner. The data points are shown in different marks depending on whether the reflectivity is 35% or higher with a wavelength of 15 μm or not.

As shown in the figure, if the Hall mobility is higher than 3.8 cm²/V·s and the carrier concentration is higher than $7 \times 10^{20}/cm^3$, the film can have a reflectivity of 35% or higher with a wavelength of 15 μm, so as to function as a radiant

TABLE 1

|  |  | Sample 1 | Sample 2 | Sample 3 | Sample 4 | Sample 5 |
|---|---|---|---|---|---|---|
| Before Vacuum Calcination | Resistivity (Ω·cm) | 2.27E−2 | 1.48E−2 | 1.60E−2 | 1.07E−2 | 1.24E−2 |
|  | Carrier Concentration (cm⁻³) | 2.73E+20 | 2.53E+20 | 1.90E+20 | 2.27E+20 | 4.44E+20 |
|  | Hall mobility (cm²/V·s) | 1.01 | 1.67 | 2.04 | 2.57 | 11.4 |
| After Vacuum Calcination | Resistivity (Ω·cm) | 4.03E−3 | 2.22E−3 | 4.26E−3 | 1.00E−3 | 8.26E−4 |
|  | Carrier Concentration (cm⁻³) | 2.68E+20 | 6.82E+20 | 6.12E+20 | 1.19E+21 | 5.57E+20 |
|  | Hall mobility (cm²/V·s) | 5.70 | 4.12 | 3.90 | 5.24 | 13.6 | heat preventive film. In addition, even if the carrier concentration is lower than $7\times 10^{20}/cm^3$, the reflectivity can still be 35% or higher if the Hall mobility is sufficiently high. Analogously, even if the Hall mobility is lower than 3.8 $cm^2/V\cdot s$, the reflectivity can still be 35% or higher if the carrier concentration is sufficiently high.

According to the above results above, when the thickness of the radiant heat preventive film is 5000 Å, the reflectivity can be 35% or higher if the following formulae are satisfied. The formulae are express as follows:

$$y \geq -5\times 10^{20}x + 3\times 10^{21} \quad (3)$$

$$y \geq -6\times 10^{18}x + 7\times 10^{20} \quad (4)$$

wherein "x" is the Hall mobility ($cm^2/V\cdot s$), and "y" is the carrier concentration ($cm^{-3}$).

According to formulae (1)–(4), when the thickness of the film is around 3000 Å to 5000 Å, the film should have a Hall mobility "x" ($cm^2/V\cdot s$), a carrier concentration "y" ($cm^{-3}$) and a thickness "t" (Å) satisfying the following formulae to have a reflectivity of 35% or higher. The formula are derived based on an interpolation or extrapolation algorithm:

$$y \geq -5\times 10^{20}x + 5\times 10^{17}t + 0.5\times 10^{21} \quad (5)$$

$$y \geq -6\times 10^{18}x + 2\times 10^{17}t - 3\times 10^{20} \quad (6)$$

Examples of Manufacture of a Glass Heat Insulating Container

As shown in FIG. 2, the heat insulating container of the embodiment is an inner body of a vacuum flask, and is constituted of an inner glass container 2 and an outer glass container 3.

Firstly, an inner container 2 is molded with a desired shape, and an outer container 3 is molded with a shape basically similar to that of the inner container 2, and with a sufficient size so that the inner container 2 can be housed therein with a gap 4 formed in-between. The outer container 3 is divided into an upper outer container 7 including an opening end 3b and a lower outer container 8 including a tip tube 11. Next, the opening end 2b of the inner container 2 is housed in the upper outer container 7 with pads disposed between them for creating a uniform gap 4. The opening end 2b of the inner container 2 and the opening end 3b of the outer container 3 are melted and integrally joined together in an airtight manner. Next, the lower part of the inner container 2 is inserted into the lower outer container 8 with a gap 4 therebetween. Then, the upper outer container 7 and the lower outer container 8 are melted near their joint and integrally joined together to form a double wall container.

Next, a material solution used for forming the intermediate film 5 is prepared having the following composition:

Si $(OC_2H_5)_4$: 28.9 wt %
$C_2H_5OH$: 43.897 wt % (remainder)
$H_2O$: 27.2 wt %
HCl: 0.003 wt %

The obtained material solution is injected into the gap 4 from the tip tube 11, thereby adhering to all surfaces defining the gap 4. Next, after excess material solution is drawn through the tip tube 11, the double wall container is heated at 190° C. for 30 minutes. With the heat treatment, the volatile components such as ethanol in the material solution are evaporated, and the material solution is dried. After the inside of the double wall container is confirmed to be fully dried, the heating temperature is raised to about 500° C., at which thermal decomposition of the raw materials of the intermediate film 5 is induced.

The degree of dryness inside the double wall container and the time point of completion of the hydrolysis-polycondensation reaction of the raw materials of the intermediate film 5 are determined according to the characteristic temperatures obtained from a pre-confirmed TG-DTA (Thermogravity/Differential Thermal Analysis) curve. In addition, as the material solution having the above-mentioned composition is used, the thickness of the film formed with only one time of the above-mentioned film formation process is 0.1–0.5 μm. Therefore, the film formation process should be conducted twice for the desired thickness of the intermediate film 5.

Next, a material solution used for forming the radiant heat preventive film 6 is prepared having the following composition.

Acetylacetone-metal complex: 10 wt %
Free acetylacetone: 10 wt %
$(CH_3)_2CHOH$: 25 wt %
Ethanol: 25 wt %
Propylene glycol: 30 wt %
4 wt % of Metal (In: Sn=95:5) is contained in this material solution.

The obtained material solution is injected into the gap 4 from the tip tube 11, thereby adhering to all surfaces defining the gap 4. Next, after excess material solution is drawn through the tip tube 11, the double wall container is heated at 190° C. The volatile components such as ethanol in the material solution are evaporated, so that the material solution is dried. After the inside of the double wall container is confirmed to be sufficiently dry, the heating temperature is raised to about 500° C., at which thermal decomposition and crystallization of the raw material of the radiant heat preventive film 6 occur.

The metal oxide (ITO) film obtained with thermal decomposition is yellowish and transparent. Next, the glass container is placed in a vacuum environment, and then heated at 400° C. to implement a heat treatment of the metal oxide film. With the heat treatment in vacuum, the metal oxide film is turned into a blackish or blueish transparent film. After the radiant heat preventive film 6 is formed, the gap 4 is made vacuum and the exhausting tip tube 11 is sealed. The whole container is then cooled, and the vacuum heat insulating container 1 is manufactured. The volume of the heat insulating container 1 is 1000 $cm^3$.

Furthermore, in order to test the heat insulating capability of the heat insulating container 1 of the embodiment, 950 $cm^3$ of hot water at 97° C. is loaded into the heat insulating container 1, which is then located in a thermostatic chamber with an atmosphere temperature of 20° C. After 6 hours, the temperature of the hot water is reduced to 69° C.

For comparison, another heat insulating container is manufactured with the same procedure except that the container is not subjected to vacuum calcination. Under the same testing conditions, the temperature of the hot water is reduced to 50° C. after 6 hours.

EFFECT OF THE INVENTION

As mentioned above, the heat insulating container of the invention has a radiant heat preventive film having a reflectivity of 35% or higher with a wavelength of 15 μm. Since such a radiant heat preventive film has a high radiant-heat prevention capability, the heat insulating container is excellent in heat insulating capability.

Moreover, in the manufacture method of the heat insulating container of this invention, a radiant heat preventive film having a high reflectivity can be formed by heating the heat insulating container, on which a metal oxide film has been formed, at 400° C. or higher in a non-oxidative environment such as a vacuum. Therefore, a heat insulating container excellent in heat insulating capability can be manufactured.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A heat insulating container, comprising an outer glass container and an inner glass container housed in the outer glass container with a gap formed in-between, the gap serving as an insulating layer, wherein
    a radiant heat preventive film containing a metal oxide is disposed on at least one of an external surface of the inner glass container and an internal surface of the outer glass container, wherein the radiant heat preventive film has a reflectivity of 35% or higher with a wavelength of 15 $\mu$m, wherein a Hall mobility, a carrier concentration and a thickness of the radiant heat preventive film are x (cm$^2$/V·s), y (cm$^{-3}$) and t(Å), respectively and x, y and t satisfy following formulae:

$y \geq -5 \times 10^{20}x + 5 \times 10^{17}t + 0.5 \times 10^{21}$ $y \geq -6 \times 10^{18}x + 2 \times 10^{17}t - 3 \times 10^{20}$.

2. The heat insulating container of claim 1, wherein a thickness of the radiant heat preventive film is 3000 Å, and a Hall mobility "x"(cm$^2$/V·s) and a carrier concentration "y"(cm$^{-3}$) of the radiant heat preventive film satisfy following formulae:

$y \geq -5 \times 10^{20}x + 2 \times 10^{21}$ $y \geq -6 \times 10^{18}x + 3 \times 10^{21}$.

3. The heat insulating container of claim 1, wherein a thickness of the radiant heat preventive film is 5000 Å, and a Hall mobility "x"(cm$^2$/V·s) and a carrier concentration "y"(cm$^{-3}$) of the radiant heat preventive film satisfy following formulae:

$y \geq -5 \times 10^{20}x + 3 \times 10^{21}$ $y \geq -6 \times 10^{18}x + 7 \times 10^{20}$.

4. The heat insulating container of claim 1, wherein the carrier concentration of the radiant heat preventive film is within a range of $1.5 \times 10^{21}$/cm$^3$ to $1 \times 10^{22}$/cm$^3$.

5. The heat insulating container of claim 2, wherein the carrier concentration of the radiant heat preventive film is within a range of $1.5 \times 10^{21}$/cm$^3$ to $1 \times 10^{22}$/cm$^3$.

6. The heat insulating container of claim 3, wherein the carrier concentration of the radiant heat preventive film is within a range of $1.5 \times 10^{21}$/cm$^3$ to $1 \times 10^{22}$ cm$^3$.

* * * * *